United States Patent [19]

Ahlf et al.

[11] 4,309,048
[45] Jan. 5, 1982

[54] ELEMENT FOR CONNECTING AN ACCESSORY INSTRUMENT TO A VACUUM CLEANER

[75] Inventors: Heinz-Jürgen Ahlf, Berg. Gladbach; Rolf Strohmeyer, Wuppertal, both of Fed. Rep. of Germany

[73] Assignee: Vorwerk & Co. Interholding GmbH, Wuppertal, Fed. Rep. of Germany

[21] Appl. No.: 102,852

[22] Filed: Dec. 11, 1979

[30] Foreign Application Priority Data

Dec. 14, 1978 [DE] Fed. Rep. of Germany ....... 2853898

[51] Int. Cl.³ .......................... F16L 27/00; A47L 9/24
[52] U.S. Cl. ......................................... 285/7; 285/184
[58] Field of Search .................. 285/7, 184, 181, 275; 403/209

[56] References Cited

U.S. PATENT DOCUMENTS 1,161,908 11/1915 Tice ................................... 285/7 X
2,116,004 5/1938 Tear ................................ 285/184 X
2,203,088 6/1940 Hansson ................................. 285/7

FOREIGN PATENT DOCUMENTS 860372 9/1945 France ............................... 285/184

Primary Examiner—Dave W. Arola
Attorney, Agent, or Firm—Michael J. Striker

[57] ABSTRACT

A connecting element for connecting an accessory instrument to a vacuum cleaner, has a front portion having a central axis and being tiltably connectable with an accessory instrument, a connecting portion having a further central axis and connectable with a vacuum cleaner as well as rotatably connected with the front portion, and a rotary joint which rotatably connects the connecting portion with the front portion. The rotary joint is arranged so that in normal position of the front and connecting portions, their central axes extend rectilinearly in one direction, whereas in a plurality of further positions the central axes of these portions extend at an angle relative to one another. Advantageously, this angle is equal to between 10° and 20°.

3 Claims, 3 Drawing Figures

ELEMENT FOR CONNECTING AN ACCESSORY INSTRUMENT TO A VACUUM CLEANER

BACKGROUND OF THE INVENTION

The present invention relates to a connecting element for connecting an accessory instrument to hand-held or floor vacuum cleaners. More particularly, it relates to a connecting element which is rotatably and tiltably supported in a housing of the additional implement and consists of a front portion supported in the housing and a rotatably mounted connecting portion.

Connecting elements of the above-mentioned general type are known in the art. All rotatable and tiltable connecting elements have identical features. A connecting part which is rotatably supported in a front part is inclined by an angle with its central axis in the normal position relative to the central axis of the front portion. This is necessary since by rotation of the connected vacuum cleaner, the accessory instrument can swivel to the right or to the left and thereby can be controlled. This, however, results in several essential disadvantages. It is not possible that a vacuum cleaner and an accessory instrument connected therewith can swivel with their main axes in one plane. Because of the bent connecting portion, the vacuum cleaner always assumes a certain angle to the horizontal plane. Only by swiveling by 90° is it possible that the vacuum cleaner is located in the plane of the accessory instrument. Then, however, the housing of the vacuum cleaner extends in a transverse direction. As a result of this, certain working heights cannot be overlapped with the aid of the known connecting elements.

SUMMARY OF THE INVENTION

Accordingly, it is an object of the present invention to provide a connecting element for connecting an accessory instrument to a vacuum cleaner, which avoids the disadvantages of the prior art.

More particularly, it is an object of the present invention to provide a connecting element for connecting an accessory instrument with a vacuum cleaner, which makes possible overlapping of small working heights in normal position, and at the same time allows swivelling and controlling of the accessory instrument.

In keeping with these objects and with others which will become apparent hereinafter one feature of the present invention resides, briefly stated, in a connecting element which has a front portion having a central axis and being tiltably connectable with an accessory instrument, a connecting portion having a further central axis and connectable with a vacuum cleaner and also connected with the front portion rotatable between a normal relative position and a plurality of further relative positions, wherein means is provided for rotatably connecting the connecting portion with the front portion so that in the normal position the central axes of the portions extend rectinlinearly in one direction, whereas in the further positions the central axes of the portions extend at an angle relative to one another.

More particularly, the connecting means is formed as a rotary joint including a central section arranged in the front portion and a shell section arranged in the connecting portion and rotatably receiving the central section, wherein the central section and the shell section are inclined relative to the central axes of the above-mentioned portions.

In accordance with another feature of the present invention, the central section has a first end part which is fixedly received in the front portion, and a second end part which is axially spaced from the first end part and extends axially outwardly beyond the front portion. The second end part of the central section is inclined relative to the axis.

When the connecting element is constructed in accordance with the present invention, the vacuum cleaner and the accessory instrument in normal position are located in one plane, and at the same time, swivelling and controlling of the accessory instrument is possible. A small working height can be overlapped with such a construction.

Advantageously the angle of inclination of the second end part of the central section of the rotary joint and of the shell section of the same are equal to between 10° and 20°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
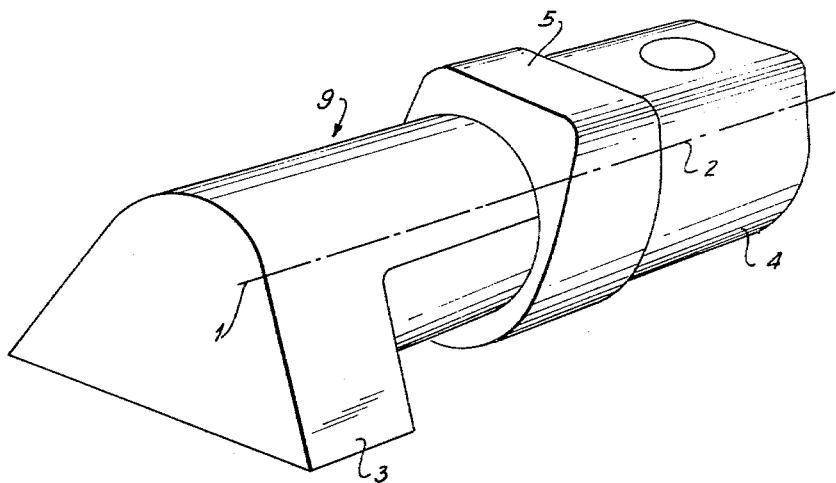
FIG. 1 is a view showing a connecting element in accordance with the present invention, in normal position.
Figure 2:
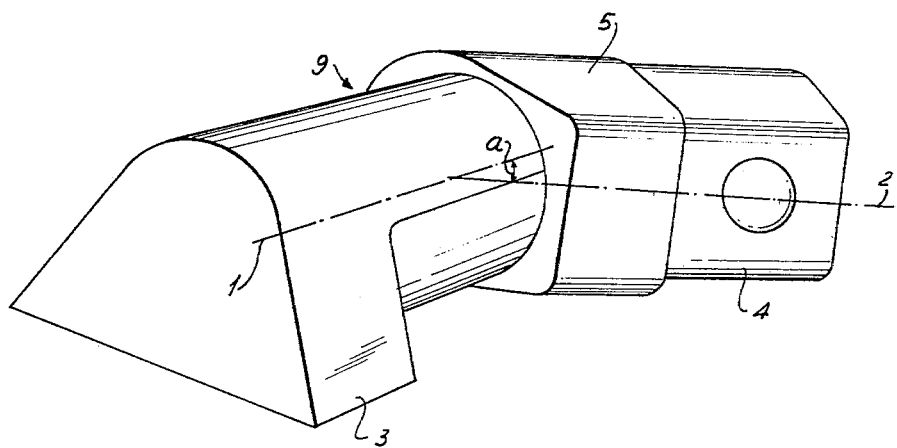
FIG. 2 is a view showing the connecting element of FIG. 1 in turned position.

A connecting element or socket in accordance with the present invention is shown in FIGS. 1 and 2 and identified in toto by reference numeral 9. The connecting element is shown without a vacuum cleaner and an accessory instrument.

The connecting element 9 has a front portion 3 and a connecting portion 4. Generally, the front portion 3 is tiltably supported in a housing of the accessory instrument (not shown). The connecting portion 4 is connected with the vacuum cleaner (also not shown). A rotary joint 5 is arranged between the front portion 3 and the connecting portion 4. The front portion 3 and the connecting portion 4 can rotate relative to one another with the aid of the rotary joint 5.

As can be seen from FIGS. 1 and 2, the central axes 1 and 2 of the front portion 3 and the rear portion 4 extend in one plane in the normal position of these portions, as shown particularly in FIG. 1. When the connecting portion 4 rotates relative to the front portion 3, as shown in FIG. 2, the central axis 2 rotates relative to the central axis 1 by the angle "α".

Figure 3:
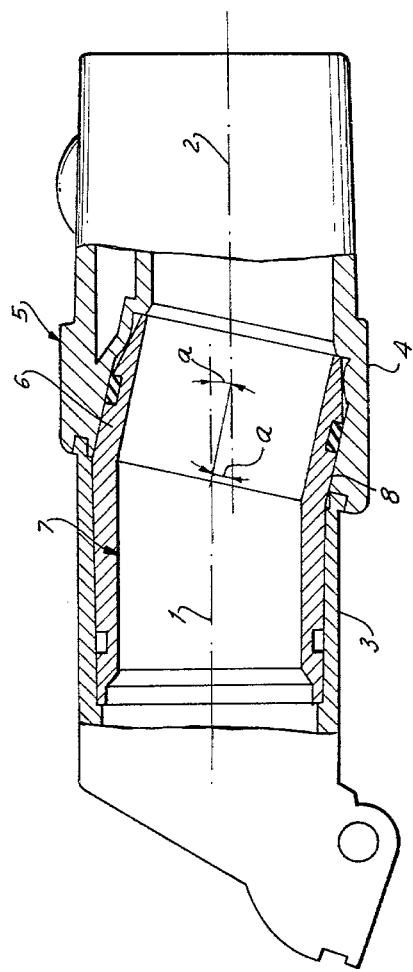
FIG. 3 is a view showing a partial section of a rotary joint of the inventive connecting element.

The construction of the rotary joint 5 is shown in detail in FIG. 3. The rotary joint 5 is arranged between the front portion 3 and the connecting portion 4. It includes a central section 7, and a supporting shell section 8 in the connecting portion 4. The central section 7 has an end part which engages in the shell section 8. The central section 7 is connected with the front portion 3 in a shape-closing and force-closing manner. On the other hand, the central section 7 is rotatably supported by its end part 6 in the shell section 8.

The end part 6 and the shell section 8 which receives the same are inclined relative to the central axes 1 and 2 by the angle "α". Because of this, the central axes 1 and 2 extend in the normal position in one plane, and by rotation of the connecting portion 4 relative to the front portion 3 to assume an angle "α". It is advantageous when the angle "α" is selected within the range of between 10° and 20°.

It will be understood that each of the elements described above, or two or more together, may also find a useful application in other types of constructions differing from the types described above.

While the invention has been illustrated and described as embodied in an element for connecting an accessory instrument to a vacuum cleaner, it is not intended to be limited to the details shown, since various modifications and structural changes may be made without departing in any way from the spirit of the present invention.

Without further analysis the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A connecting element for connecting an accessory instrument to a vacuum cleaner, comprising a front portion having a central axis and being tiltably connectable with an accessory instrument; a connecting portion having a further central axis and connectable with a vacuum cleaner, said connecting portion being connected with said front portion rotatable between a normal relative position and a plurality of further relative positions; and means for rotatably connecting said connecting portion with said front portion so that in said normal position the central axes of said portions extend rectilinearly in one direction, whereas in said further positions the central axes of said portions extend at angles relative to one another, said connecting means being formed by a rotary joint including a shell section formed in the interior of said connecting portion, and a central section which is separate from said front portion and has a first end part arranged in the interior of said front portion and a second end part extending axially outwardly beyond the latter and into the interior of said shell section, said second end part of said central section having a radially outer surface which is inclined relative to said first-mentioned central axis, whereas said shell section has a radially inner surface which is inclined relative to said second-mentioned central axis, said inclined surfaces cooperating with one another for rotation of said portions between said positions, and said inclined surfaces as well as all parts of said joint being arranged inside said portions.

2. A connecting element as defined in claim 1, wherein said first end part of said central section is fixedly connected with said front portion.

3. A connecting element as defined in claim 1, wherein said angle of inclination of said central section and said shell section is equal to between 10° and 20°.

* * * * *